United States Patent
Enzmann et al.

(10) Patent No.: US 11,061,174 B2
(45) Date of Patent: Jul. 13, 2021

(54) DIFFRACTIVE OPTICAL ELEMENT, METHOD OF PRODUCING A DIFFRACTIVE OPTICAL ELEMENT AND LASER COMPONENT

(71) Applicant: OSRAM Opto Semiconductors GmbH, Regensburg (DE)

(72) Inventors: Roland Enzmann, Gelugor (MY); Hubert Halbritter, Dietfurt-Toeging (DE); Adrian Stefan Avramescu, Regensburg (DE); Thomas Hager, Massing (DE); Georg Roßbach, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 207 days.

(21) Appl. No.: 16/086,133

(22) PCT Filed: Mar. 16, 2017

(86) PCT No.: PCT/EP2017/056235
§ 371 (c)(1),
(2) Date: Sep. 18, 2018

(87) PCT Pub. No.: WO2017/158091
PCT Pub. Date: Sep. 21, 2017

(65) Prior Publication Data
US 2020/0201055 A1 Jun. 25, 2020

(30) Foreign Application Priority Data
Mar. 18, 2016 (DE) .................... 10 2016 105 063.6

(51) Int. Cl.
*G02B 5/18* (2006.01)
*G02B 27/09* (2006.01)

(52) U.S. Cl.
CPC ............. *G02B 5/18* (2013.01); *G02B 5/1847* (2013.01); *G02B 27/0916* (2013.01); *G02B 27/0944* (2013.01)

(58) Field of Classification Search
CPC .. G02B 5/1809; G02B 5/1814; G02B 5/1866; G02B 5/18; G02B 5/1857; G02B 5/1861;
(Continued)

(56) References Cited

U.S. PATENT DOCUMENTS 9,598,785 B2 * 3/2017 Patolsky .................. C25D 5/18
9,650,723 B1 * 5/2017 D'Evelyn ............... C30B 7/105
(Continued)

FOREIGN PATENT DOCUMENTS

| EP | 1 727 217 A2 | 11/2006 |
| EP | 1 821 378 A1 | 8/2007 |
| JP | 2014-137853 A | 7/2014 |

OTHER PUBLICATIONS

Ku, Jui-Tai & Yang,, Tsung-Hsi & Chang,, Jet-Rung & Wong, Yuen-Yee & Chou, Wu-Ching & Chang, Chun-Yen & Chen, Chiang-Yao. Epitaxial Overgrowth of Gallium Nitride Nano-Rods on Silicon (111) Substrates by RF-Plasma-Assisted Molecular Beam Epitaxy. 2010. Japanese Journal of Applied Physics. 49. 10.114 (Year: 2010).*

(Continued)

*Primary Examiner* — Darryl J Collins
*Assistant Examiner* — Tamara Y. Washington
(74) *Attorney, Agent, or Firm* — DLA Piper LLP (US)

(57) ABSTRACT

A diffractive optical element includes a carrier and a plurality of nano- or micro-scale rods arranged above a top side of the carrier, wherein the rods are arranged parallel to one another in a regular grid arrangement. A method of producing a diffractive optical element includes providing a carrier and epitaxially growing a plurality of mutually parallel
(Continued)

nano- or micro-scale rods in a regular gird arrangement above a top side of the carrier.

18 Claims, 6 Drawing Sheets

(58) Field of Classification Search
CPC .......... G02B 5/1842; G02B 2005/1804; G02B 27/0944; G02B 27/1086; G02B 27/0916; G01J 3/1804; G01J 3/0208; G01J 3/02; G01J 3/021; G01J 3/0256; G01J 3/0291
USPC .......................................................... 359/569
See application file for complete search history.

(56) References Cited

U.S. PATENT DOCUMENTS

| | | | |
|---|---|---|---|
| 9,695,055 B2* | 7/2017 | Yoon | C01B 39/48 |
| 9,915,603 B1* | 3/2018 | Hug | G01J 3/10 |
| 9,954,126 B2* | 4/2018 | Smith | H01L 31/035227 |
| 9,961,731 B2* | 5/2018 | Reed | F21V 29/763 |
| 9,963,633 B2* | 5/2018 | Dubertret | C09K 11/883 |
| 2002/0022290 A1 | 2/2002 | Kong et al. | |
| 2003/0104678 A1 | 6/2003 | Kelly et al. | |
| 2013/0107367 A1 | 5/2013 | Zhu et al. | |
| 2014/0263982 A1 | 9/2014 | Shkunov et al. | |
| 2015/0185378 A1 | 7/2015 | Lin et al. | |
| 2015/0253470 A1 | 9/2015 | Liu et al. | |
| 2018/0327669 A1* | 11/2018 | Hatsusaka | C09K 19/542 |
| 2019/0173128 A1* | 6/2019 | Visco | G01N 21/8422 |
| 2019/0204511 A1* | 7/2019 | Grille | G02B 6/12007 |
| 2020/0014063 A1* | 1/2020 | Visco | H01M 2/145 |
| 2020/0028209 A1* | 1/2020 | Visco | G01N 21/896 |
| 2020/0036003 A1* | 1/2020 | Haag | H01M 4/134 |

OTHER PUBLICATIONS

Wang, X. et al., "Fabrication of GaN nanowire arrays by confined epitaxy", 2006, *Appl. Phys. Lett.* 89, 233115.

* cited by examiner

DIFFRACTIVE OPTICAL ELEMENT, METHOD OF PRODUCING A DIFFRACTIVE OPTICAL ELEMENT AND LASER COMPONENT

TECHNICAL FIELD

This disclosure relates to a diffractive optical element, a method of producing a diffractive optical element and a laser component.

BACKGROUND

It is known to equip light emitting components, for example, laser components with diffractive optical elements that shape, expand or attenuate light emitted by the light emitting component. This may be necessary, for example, to ensure eye safety of the light emitting component.

SUMMARY

We provide a diffractive optical element including a carrier and a plurality of nano- or micro-scale rods arranged above a top side of the carrier, wherein the rods are arranged parallel to one another in a regular grid arrangement.

We also provide a method of producing a diffractive optical element including providing a carrier; and epitaxially growing a plurality of mutually parallel nano- or micro-scale rods in a regular grid arrangement above a top side of the carrier.

We further provide a laser component including a laser light source and the diffractive optical element including a carrier and a plurality of nano- or micro-scale rods arranged above a top side of the carrier, wherein the rods are arranged parallel to one another in a regular grid arrangement arranged in the light path of the laser light source.

LIST OF REFERENCE SIGNS

Figure 1:
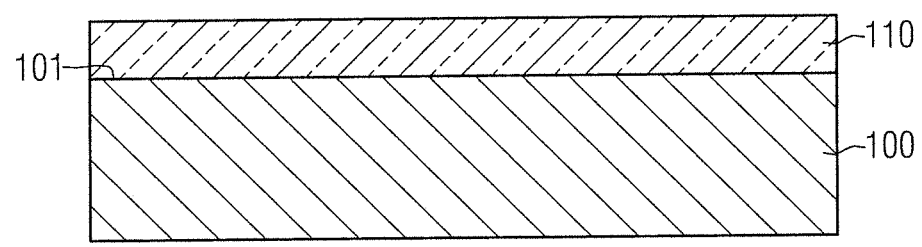
FIG. 1 schematically shows a carrier with a buffer layer arranged above its top side.

10 Diffractive optical element
100 Carrier
101 Top side
110 Buffer layer
120 Mask structure
130 Opening
131 Grid arrangement
200 Rods
201 Grid arrangement
210 Cross section
220 Diameter
230 Spacing
240 Length
250 First group
260 Second group
270 Second length
300 Protective layer
310 Protecting layer
400 Laser component
410 Laser light source
420 Light path
430 Laser beam
440 Expanded beam

DETAILED DESCRIPTION

Our diffractive optical element comprises a carrier and a plurality of nano- or micro-scale rods arranged above a top side of the carrier. In this case, the rods are arranged parallel to one another in a regular grid arrangement.

The rods of the diffractive optical element may also be referred to as micro- or nanorods. The mutually parallel rods of the diffractive optical element may act as diffraction grating to diffract light radiated through the diffractive optical element. As a result, the diffractive optical element may advantageously bring about beam shaping and/or beam expansion. The diffractive optical element may be producible simply and cost-effectively. In this case, the diffractive optical element may be insensitive to environmental influences and mechanical influences and comprise a long lifetime as a result. The diffractive optical element may advantageously be suitable for mounting by reflow soldering.

The rods may comprise GaN. Advantageously, the diffractive optical element may thereby be produced by cost-effective standard processes.

The rods may be arranged in a hexagonal grid arrangement. Advantageously, this results in an arrangement of the rods in which all direct neighbors of a rod comprise the same distance. Advantageously, a hexagonal grid arrangement of the rods may be combined well with a hexagonal crystal structure of the material of the rods.

The rods may each comprise a hexagonal cross section. In this case, the cross section of the rods may be predefined, for example, by a crystal structure of the material of the rods. Advantageously, rods comprising a hexagonal cross section may be arranged well in a hexagonal grid arrangement.

The rods may be covered by a protective layer. Advantageously, the protective layer may afford protection of the rods against environmental influences and mechanical influences. In particular, the protective layer may prevent condensation of water on the rods. As a result, the diffractive optical element is formed robustly and may comprise a long lifetime.

The protective layer may comprise $SiO_2$, SiN, a silicone, a phosphate glass, an epoxy or polymethyl methacrylate (PMMA). Advantageously, this may result in a high difference in refractive index between the material of the rods and the material of the protective layer.

Neighboring rods may comprise a distance from one another of 0.5 µm to 5 µm, in particular 1 µm to 3 µm. Advantageously, the diffractive optical element is thereby suitable for diffracting light comprising a wavelength from the visible spectral range.

The rods may each comprise a length of 0.5 µm to 50 µm, in particular 0.5 µm to 3 µm. Advantageously, the diffractive optical element is thereby suitable for diffracting light comprising a wavelength from the visible spectral range.

The rods may each comprise a diameter of 100 nm to 5 µm. Advantageously, rods comprising such a diameter may be produced simply, cost-effectively and reproducibly.

The rods may comprise an average roughness $R_a$ of less than 0.5 nm. Advantageously, the diffractive optical element may thereby comprise low scattering losses.

The diffractive optical element may comprise a first group of rods and a second group of rods. In this case, the rods of the first group comprise a greater length than the rods of the second group. Advantageously, the diffractive optical element may thereby bring about complex beam shaping of light radiated through the diffractive optical element. By way of example, the diffractive optical element in this case may generate point patterns.

Our method of producing a diffractive optical element comprises steps of providing a carrier and epitaxially growing a plurality of mutually parallel nano- or micro-scale rods in a regular grid arrangement above a top side of the carrier.

Advantageously, this method allows simple and cost-effective production of an optical element. In this case, the epitaxially grown rods may be produced with a very high aspect ratio and with very smooth vertical facets. The rods of the diffractive optical element obtainable by the method may serve as a diffraction grating to expand and/or shape in some other way a laser beam directed onto the diffractive optical element.

The method may comprise a step of forming a mask structure comprising a plurality of openings arranged in a regular grid arrangement, above a top side of the carrier. In this case, the rods are grown above the openings of the mask structure. Advantageously, the arrangement of the epitaxially grown rods may be defined by the mask structure. In this case, the regular grid arrangement of the epitaxially grown rods reproduces the regular grid arrangement of the openings formed in the mask structure.

The mask structure may be formed from a silicon oxide. Advantageously, the mask structure may thereby be formed in a simple and cost-effective manner by standard processes.

The carrier may be provided with a crystalline buffer layer arranged above its top side. In this case, the rods are grown above the buffer layer. Advantageously, the crystalline buffer layer enables the rods to be grown epitaxially. This makes it possible to use a carrier that comprises no crystal structure or a crystal structure deviating from the rods.

The buffer layer may comprise GaN or AlN. Advantageously, the method may thereby be carried out simply and cost-effectively and using standard processes.

The method may further comprise steps of covering a first group of the rods, wherein a second group of the rods is not covered, and continuing the epitaxial growth of the rods of the second group. Advantageously, the diffractive optical element may thereby be formed with rods of varying length. The diffractive optical element thus obtainable may thereby bring about more complex beam shaping, for example, generation of a point pattern.

The method may comprise a further step of covering the rods with a protective layer. Advantageously, the protective layer covering the rods may afford protection of the rods against environmental influences and mechanical influences. By way of example, the protective layer may prevent condensation of moisture on the rods.

The protective layer may be applied by a cathode sputtering method (sputtering). Advantageously, this enables the protective layer to be applied simply and cost-effectively.

Our laser component comprises a laser light source and a diffractive optical element of the type mentioned above arranged in the light path of the laser light source.

Advantageously, the diffractive optical element may bring about beam shaping of a laser beam emitted by the laser light source. By way of example, the diffractive optical element may expand a laser beam emitted by the laser light source. As a result, the diffractive optical element may ensure, for example, eye safety of the laser component. The diffractive optical element may also generate a point pattern or some other light pattern from a laser beam emitted by the laser light source.

The above-described properties, features and advantages and the way in which they are achieved will become clearer and more clearly understood in association with the following description of examples explained in greater detail in association with the drawings.

FIG. 1 shows a schematic sectional side view of a carrier 100. The carrier 100 comprises a substantially planar top side 101. The carrier 100 may be formed, for example, as a sapphire wafer.

A buffer layer 110 is arranged at the top side 101 of the carrier 100. The buffer layer 110 comprises a crystalline material. By way of example, the buffer layer 110 may comprise GaN or AlN.

Figure 2:
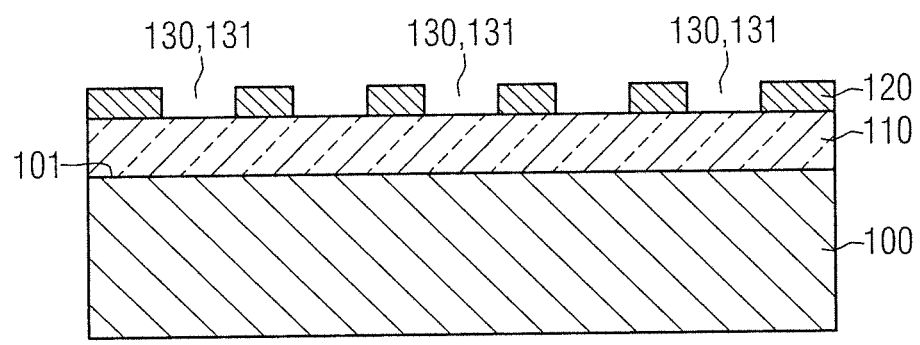
FIG. 2 schematically shows the carrier with a mask structure formed above the buffer layer.

FIG. 2 shows a schematic sectional side view of the carrier 100 with the buffer layer 110 arranged above the top side 101 of the carrier 100 in a processing state temporally succeeding the illustration in FIG. 1.

A mask structure 120 has been formed above the buffer layer 110. The mask structure 120 may comprise, for example, a silicon oxide. The mask structure 120 may have been formed, for example, by a lithographic method.

The mask structure 120 comprises a plurality of openings 130. The buffer layer 110 is exposed in the region of the openings 130. The remaining sections of the buffer layer 110 are covered by the mask structure 120.

The openings 130 are arranged in a regular grid arrangement 131. The grid arrangement 131 may be, for example, a hexagonal grid arrangement.

Figure 3:
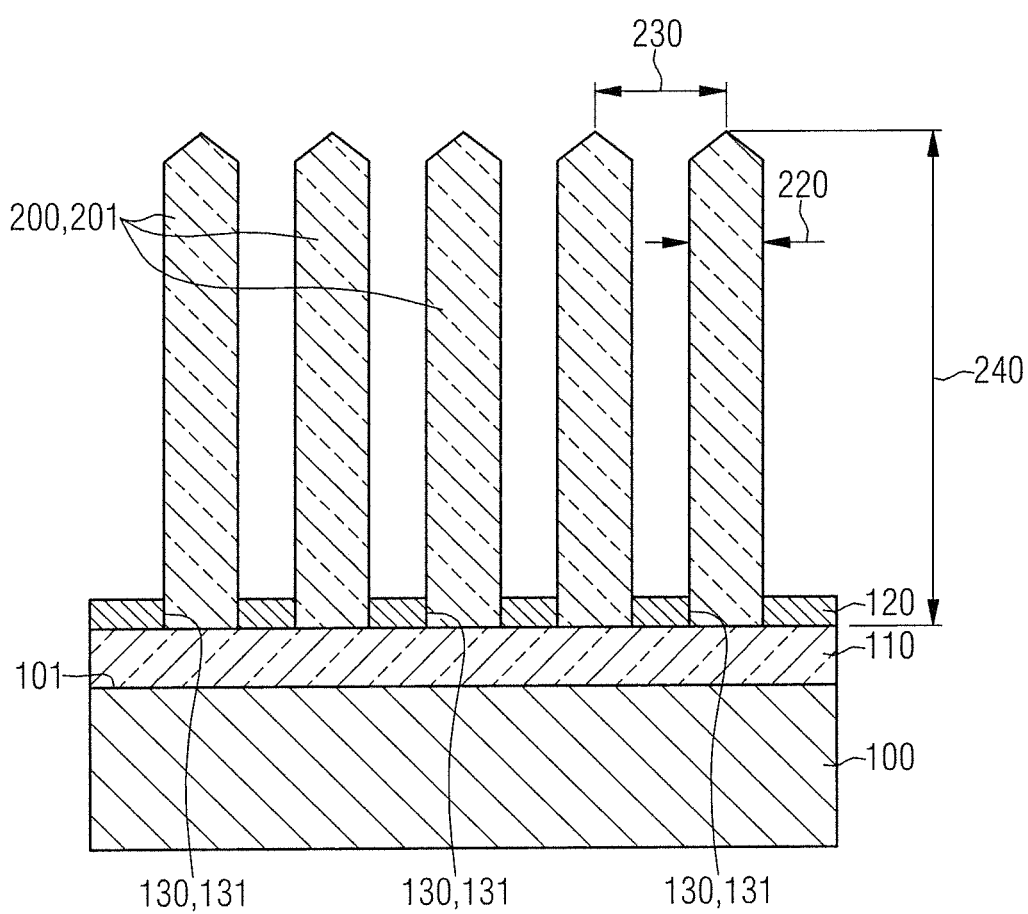
FIG. 3 schematically shows the carrier with rods grown above its top side.

FIG. 3 shows a schematic sectional side view of the carrier 100 with the buffer layer 110 arranged above the top side 101 of the carrier 100 and with the mask structure 120 arranged above the buffer layer 110 in a processing state temporally succeeding the illustration in FIG. 2.

Figure 4:
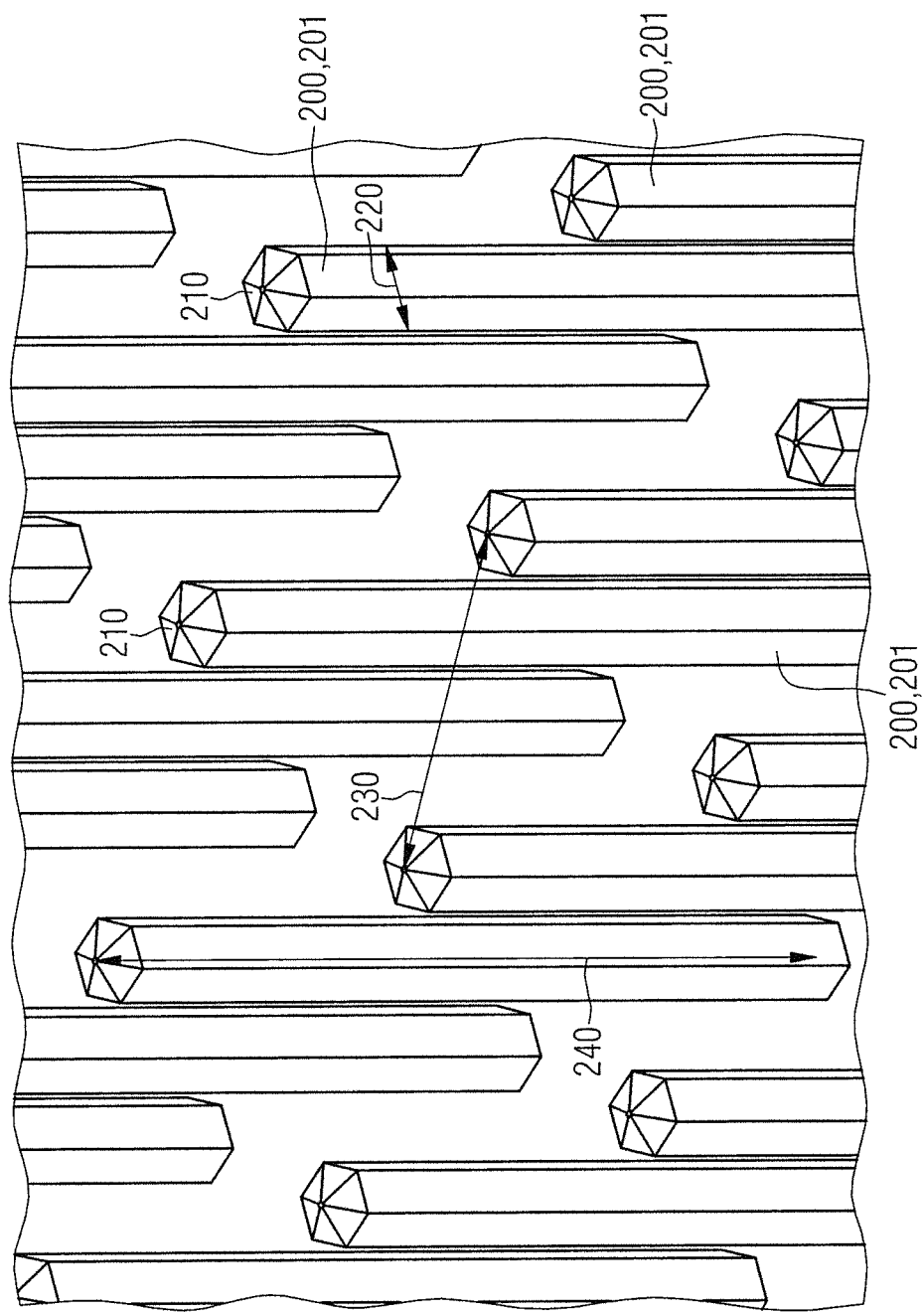
FIG. 4 schematically shows a perspective illustration of the rods grown above the carrier.

A plurality of nano- or micro-scale rods 200 have been grown above the top side 101 of the carrier 100. The nano- or micro-scale rods 200 may also be referred to as nanorods or as microrods. FIG. 4 shows a schematic perspective illustration of the rods 200 grown above the top side 101 of the carrier 100.

The rods 200 have been produced by epitaxial growth. The epitaxial growth of the rods 200 began in the openings 130 of the mask structure 120 at the buffer layer 110. One rod 200 has grown in each opening 130 of the mask structure 120. As a result, the positions of the rods 200 are predefined by the positions of the opening 130 of the mask structure 120. In this case, the rods 200 have grown beyond the mask structure 120 in a direction perpendicular to the top side 101 of the carrier 100.

The rods 200 are arranged perpendicular to the top side 101 of the carrier 100 and parallel to one another. In this case, the rods 200 are arranged in a regular grid arrangement 201, which has been predefined by the grid arrangement 131 of the openings 130 of the mask structure 120. The grid arrangement 201 of the rods 200 thus largely corresponds to the grid arrangement 131 of the openings 130 provided in the mask structure 120. The grid arrangement 201 of the rods 200 may be, for example, a hexagonal grid arrangement.

The grid arrangement 201 of the rods 200 might also be an elongated, non-equilateral, hexagonal grid arrangement in which two mutually opposite sides of the hexagon are longer than the other sides of the hexagon. In this case, the grid spacing of the grid arrangement 201 is greater in a first direction than in a second direction rotated with respect thereto.

The rods 200 may comprise GaN, for example. Each rod 200 comprises a cross section 210 oriented parallel to the top side 101 of the carrier 100. The cross sections 210 of the rods 200 may be formed hexagonally, for example. The cross sections 210 of the rods 200 may be defined by the crystal lattice of the material of the rods 200.

Each rod 200 comprises a diameter 220 dimensioned parallel to the top side 101 of the carrier 100. In this case, the diameter may be 100 nm to 5 µm, for example. By way of example, the diameter 220 of the rods 200 may be 200 nm. The diameter 220 of the rods 200 may have been defined by the size of the openings 130 of the mask structure 120.

The rods 200 might also comprise elongated hexagonal cross sections 210 in which two mutually opposite sides of the hexagon are longer than the other sides of the hexagon. In this case, the diameter 220 is larger in a first direction than in a second direction rotated with respect thereto. Such cross sections 210 may be predefined, for example, by elongated openings 130 of the mask structure 120.

Neighboring rods 200 each comprise a distance 230 from one another. The distance 230 may be, for example, 0.5 µm to 5 µm. In particular, the distance 230 may be, for example, 1 µm to 3 µm. In particular, neighboring rods 200 may comprise, for example, a distance 230 of 2 µm from one another.

Each rod 200 comprises a length 240 dimensioned in a direction perpendicular to the top side 101 of the carrier 100. The length 240 of the rods 200 may be, for example, 0.5 µm to 50 µm. In particular, the length 240 of the rods 200 may be, for example, 0.5 µm to 3 µm. The rods 200 may comprise, for example, a length 240 of 1 µm.

The rods 200 produced by epitaxial growth may comprise a very low lateral roughness. That means that the outer faces of the rods 200 may be very smooth. By way of example, the outer faces of the rods 200 may comprise an average roughness $R_a$ of less than 0.5 nm.

Figure 7:
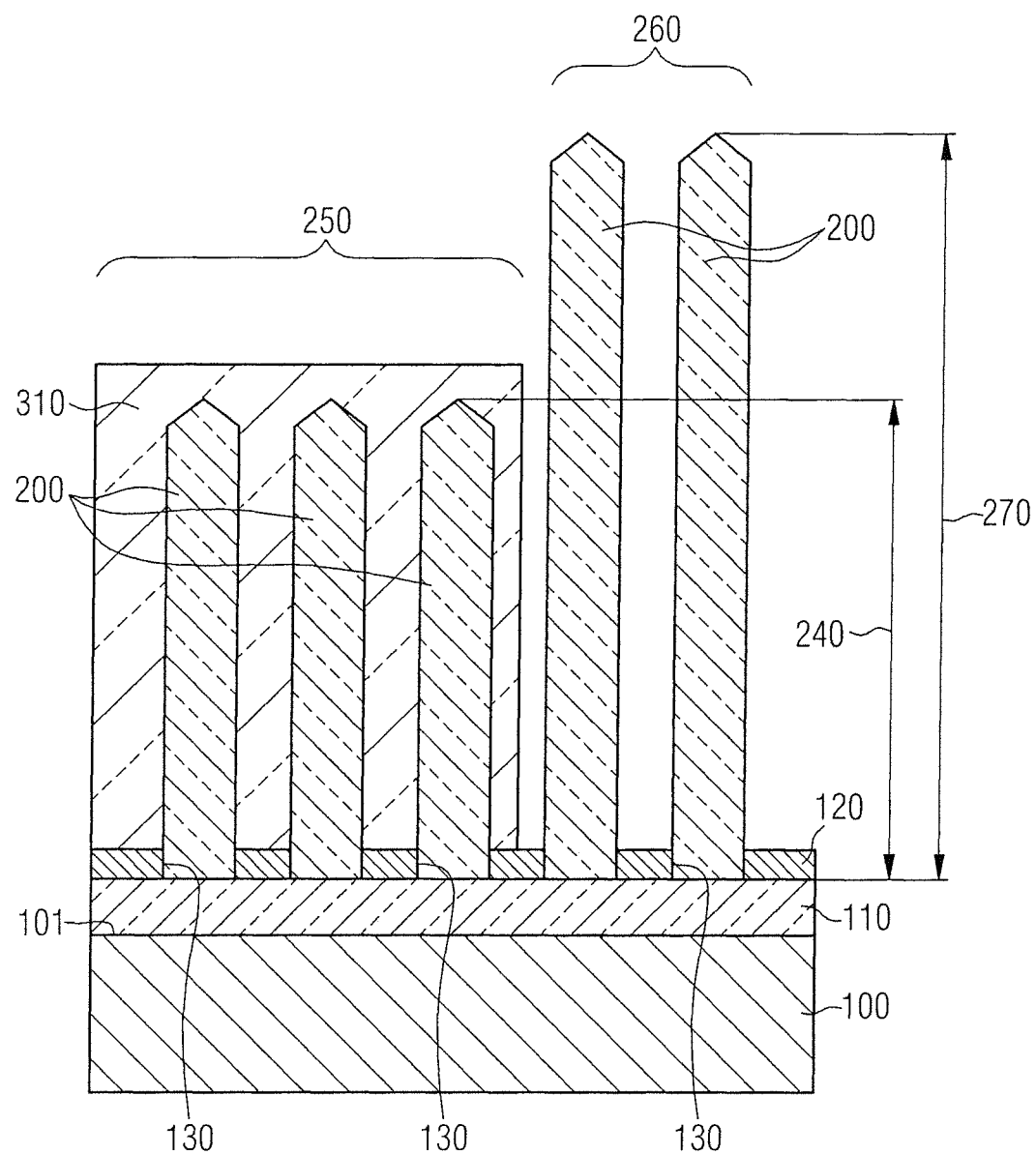
FIG. 7 schematically shows the carrier with a plurality of groups of rods of varying lengths.

As shown in a schematic illustration in FIG. 7, it is possible, proceeding from the processing state shown in FIG. 3 to cover a first group 250 of the rods 200 with a protecting layer 310 and not to cover a second group 260 of the rods 200 by the protecting layer 310. Afterward, the epitaxial growth of the rods 200 of the second group 260 may be continued such that the rods 200 of the second group 260 continue to grow up to a second length 270, while the rods 200 of the first group 250 covered by the protecting layer 310 no longer continue to grow, with the result that their length 240 does not increase further. This makes it possible to form the rods 200 of the second group 260 with a greater length 270 than the rods 200 of the first group 250. The protecting layer 310 may subsequently be removed. The method is then continued as described below. The method described may also be carried out multiply to create a greater number of groups comprising rods 200 of varying lengths.

Figure 5:
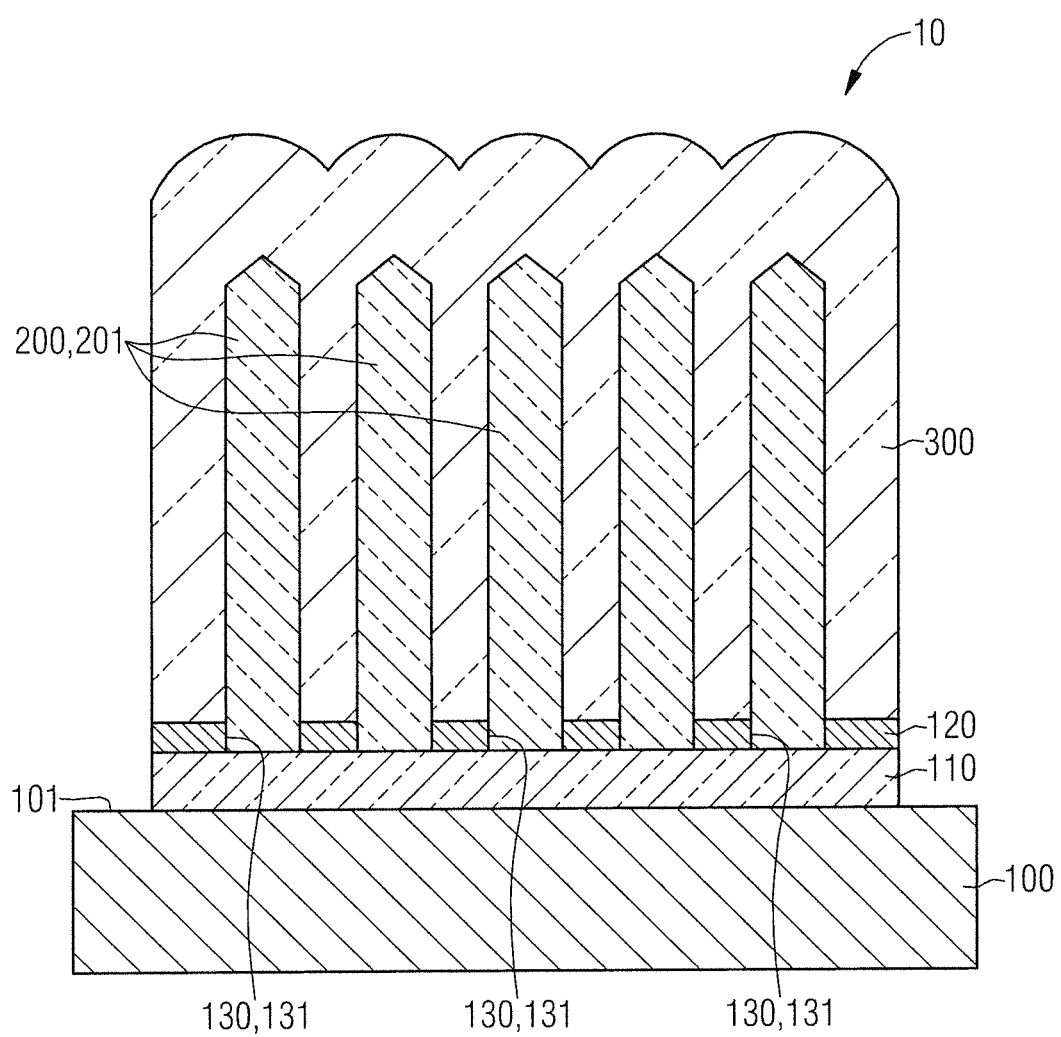
FIG. 5 schematically shows the carrier and the rods with a protective layer arranged above the rods.

FIG. 5 shows a schematic sectional side view of the carrier 100 and of the rods 200 arranged above the top side 101 of the carrier 100 in a processing state temporally succeeding the illustration in FIG. 3.

The rods 200 have been covered with a protective layer 300. The protective layer 300 fills the space between the rods 200 and adjoins the mask structure 120. At the same time the protective layer 300 also covers the longitudinal ends of the rods 200 facing away from the carrier 100 such that the rods 200 are completely embedded into the protective layer 300.

The protective layer 300 comprises a transparent material, the refractive index of which expediently differs distinctly from the refractive index of the material of the rods 200. By way of example, the protective layer 300 may comprise $SiO_2$, SiN, a silicone, a phosphate glass, an epoxy or polymethyl methacrylate (PMMA).

The protective layer 300 may have been applied, for example, by a cathode sputtering method (sputtering).

The carrier 100 with the rods 200 arranged above the top side 101 of the carrier 100 and with the protective layer 300 covering the rods 200 forms a diffractive optical element 10. The diffractive optical element 10 may serve as diffraction grating for light, for example, as diffraction grating for light comprising a wavelength from the visible spectral range. The diffractive optical element 10 may, for example, attenuate or expand or shape in some other way a light beam, for example, a laser beam.

If the grid arrangement 201 of the rods 200 and/or the cross sections 210 of the rods 200 are not formed simultaneously, the region (field of view) illuminated by the diffractive optical element 10 may be formed asymmetrically.

If the rods 200 of the diffractive optical element 10 comprise a low roughness, the diffractive optical element 10 may advantageously comprise low scattering losses.

Figure 6:
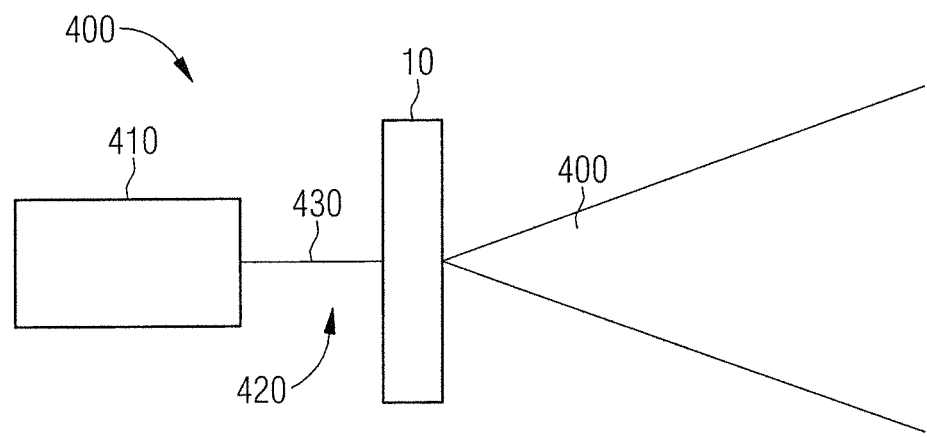
FIG. 6 schematically shows a laser component including a laser light source and a diffractive optical element.

FIG. 6 shows a highly schematic block diagram of a laser component 400. The laser component 400 comprises a laser light source 410 configured to emit a laser beam 430 along a light path 420. The laser light source 410 may comprise a semiconductor laser diode, for example.

The laser component 400 furthermore comprises the diffractive optical element 10. The diffractive optical element 10 is arranged in the light path 420 of the laser light source 410 such that the laser beam 430 emitted by the laser light source 410 penetrates through the diffractive optical element 10. In this case, the laser beam 430 impinges on the diffractive optical element 10 in a direction substantially parallel to the rods 200 of the diffractive optical element 10.

The diffractive optical element 10 expands the laser beam 430 such that the latter emerges as expanded beam 440 from the diffractive optical element 10. Compared to with the non-expanded laser beam 430, the expanded beam 440 may be attenuated, for example, such that the expanded beam 440 poses no danger to the eyes and skin of persons.

The diffractive optical element 10 of the laser component 400 might also be configured to shape the laser beam 430 in some other way. By way of example, the diffractive optical element 10 might be configured to split the laser beam 430 into a plurality of individual partial beams.

Our elements, methods and components have been illustrated and described in greater detail on the basis of preferred examples. Nevertheless, this disclosure is not restricted to the examples disclosed. Rather, other variations may be derived therefrom by those skilled in the art without departing from the scope of protection of the appended claims.

This application claims priority of DE 10 2016 105 063.6, the subject matter of which is incorporated herein by reference.

The invention claimed is:

1. A diffractive optical element comprising a carrier and a plurality of nano- or micro-scale rods arranged above a top side of the carrier, wherein the rods 1) are arranged parallel to one another in a regular grid arrangement, and 2) comprise a first group of the rods and a second group of the rods, and the rods of the second group comprise a greater length than the rods of the first group.

2. The diffractive optical element according to claim 1, wherein the rods comprise gallium nitride.

3. The diffractive optical element according to claim 1, wherein the rods each comprise a hexagonal cross section.

4. The diffractive optical element according to claim 1, wherein the carrier is formed as a sapphire wafer.

5. The diffractive optical element according to claim 1, wherein the rods are covered by a protective layer.

6. The diffractive optical element according to claim 5, wherein the protective layer comprises silicon dioxide, silicon nitride, a silicone, a phosphate glass, an epoxy or polymethyl methacrylate.

7. The diffractive optical element according to claim 1, wherein neighboring rods comprise a distance from one another of 0.5 µm to 5 µm.

8. The diffractive optical element according to claim 1, wherein the rods each comprise a length of 0.5 µm to 50 µm.

9. The diffractive optical element according to claim 1, wherein the rods comprise an average roughness $R_a$ of less than 0.5 nm.

10. A method of producing a diffractive optical element comprising:
    providing a carrier; and
    epitaxially growing a plurality of mutually parallel nano- or micro-scale rods in a regular grid arrangement above a top side of the carrier.

11. The method according to claim 10, further comprising:
    forming a mask structure comprising a plurality of openings arranged in a regular grid arrangement above a top side of the carrier,
    wherein the rods are grown above the openings of the mask structure.

12. The method according to claim 11, wherein the mask structure is formed from a silicon oxide.

13. The method according to claim 10,
    wherein the carrier is provided with a crystalline buffer layer arranged above its top side, and
    the rods are grown above the buffer layer.

14. The method according to claim 13, wherein the buffer layer comprises gallium nitride or aluminum nitride.

15. The method according to claim 10, further comprising:
    covering a first group of the rods, wherein a second group of the rods is not covered; and
    continuing the epitaxial growth of the rods of the second group.

16. The method according to claim 10, further comprising covering the rods with a protective layer.

17. The method according to claim 16, wherein the protective layer is applied by a cathode sputtering method.

18. A laser component comprising a laser light source and a diffractive optical element comprising a carrier and a plurality of nano- or micro-scale rods arranged above a top side of the carrier, wherein the rods 1) are arranged parallel to one another in a regular grid arrangement, and 2) comprise a first group of the rods and a second group of the rods, and
    the rods of the second group comprise a greater length than the rods of the first group, arranged in the light path of the laser light source.

* * * * *